United States Patent [19]

deGroot

[11] Patent Number: 4,854,802
[45] Date of Patent: Aug. 8, 1989

[54] PLANT TRANSFER MECHANISM

[75] Inventor: Peter F. deGroot, Monterey, Calif.

[73] Assignee: Bud Antle, Inc., Salinas, Calif.

[21] Appl. No.: 88,759

[22] Filed: Aug. 24, 1987

Related U.S. Application Data

[63] Continuation-in-part of Ser. No. 900,942, Aug. 27, 1986.

[51] Int. Cl.$^4$ .............................................. A01C 11/00
[52] U.S. Cl. ................................. 414/404; 198/463.2; 198/432; 111/105; 414/417; 414/502; 414/518
[58] Field of Search ............... 414/403, 404, 416, 417, 414/786, 500, 501, 518, 502; 111/1, 2, 3; 198/463.2, 433, 432

[56] References Cited

U.S. PATENT DOCUMENTS

| | | | |
|---|---|---|---|
| 2,154,126 | 4/1939 | Heyne | 198/463.2 X |
| 3,370,689 | 2/1968 | vander Winden | 198/463.2 X |
| 4,388,035 | 6/1983 | Cayton et al. | 414/417 |
| 4,443,151 | 4/1984 | Armstrong et al. | 414/404 |
| 4,454,829 | 6/1984 | Sena | 414/417 X |

FOREIGN PATENT DOCUMENTS

| | | | |
|---|---|---|---|
| 651649 | 4/1951 | United Kingdom | 198/432 |
| 2140261 | 11/1984 | United Kingdom | 111/3 |
| 2166634 | 5/1986 | United Kingdom | 111/3 |

*Primary Examiner*—Frank E. Werner
*Attorney, Agent, or Firm*—Townsend and Townsend

[57] ABSTRACT

An improved transfer mechanism for extracting and transporting plants from a high density incubating tray to a singulated constant velocity conveyed path in which each plant is gripped by planting fingers is set forth. The planter is moved across a field at relatively constant velocity and has the planting fingers conventionally depositing the plant upright and stationary with respect to the passing ground where they are covered by conventional furrowing and packing apparatus. The conveying planting fingers are serially mounted on an endless conveyor and hence pass the vicinity of the incubating tray from which extraction and transfer of the plants must occur at a relatively constant velocity. A tray extraction mechanism is provided which includes a tray conveyor, plant extractor plugs and a tray extraction reciprocation apparatus. The tray extraction reciprocation apparatus functions to oscillate the tray conveyor and plant extractors parallel to the path of the planting fingers. When the oscillation is in the same direction as the conveyed planting fingers, the speed of the planting conveyor is synchronized to the speed of the planting fingers. After this synchronization has occurred, the tray conveyor advances a row of plants into the opened planting fingers and the fingers close gripping the plant at the stem. At substantially the same time, the plug extractors and tray move relative to one another so that in cooperation with the gripping planting fingers, the plants are urged out of the tray. Once the plants are clear of the tray, the plug extractors retract completely through and out of the tray and the oscillation continues with movement opposite to the direction of the conveyed chain for the next cycle. By the expedient of loading the serially conveyed fingers with tray wide rows of plants, plant acceleration forces occur when the plant is protected by its incubating tray. Both transporting and transplanting of the plant occured with the required forces of acceleration held to a minimum. A timing screw is set forth for driving the tray conveyor. An array of the set forth planters is set forth.

6 Claims, 13 Drawing Sheets

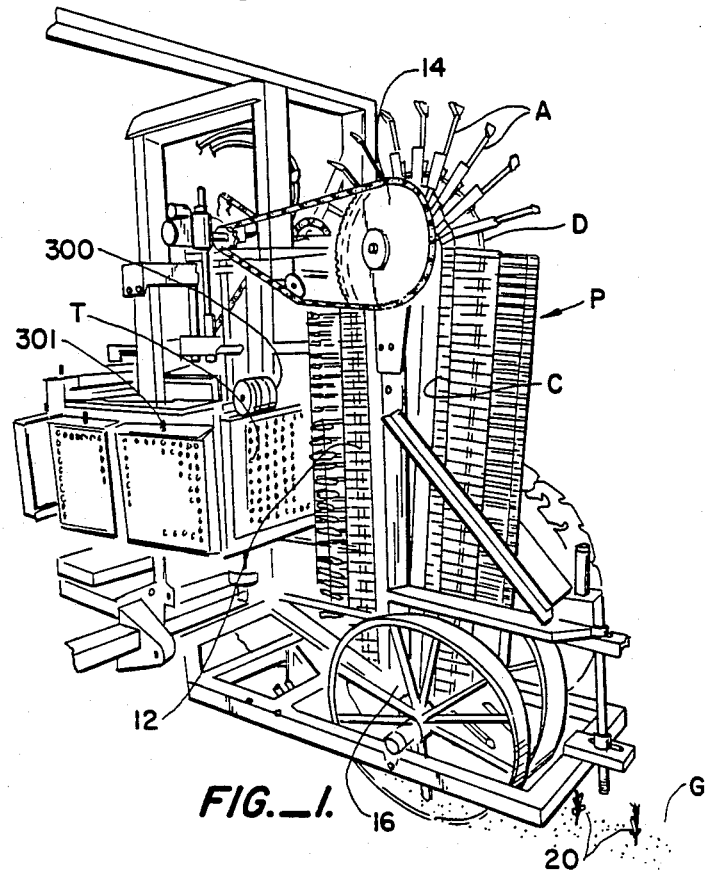
FIG.__1.
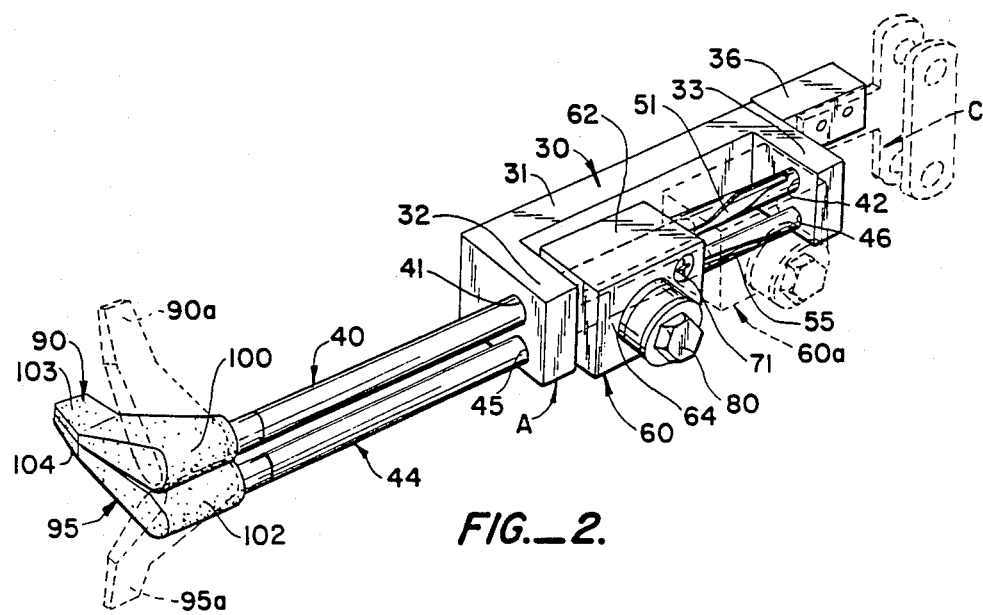
FIG.__2.

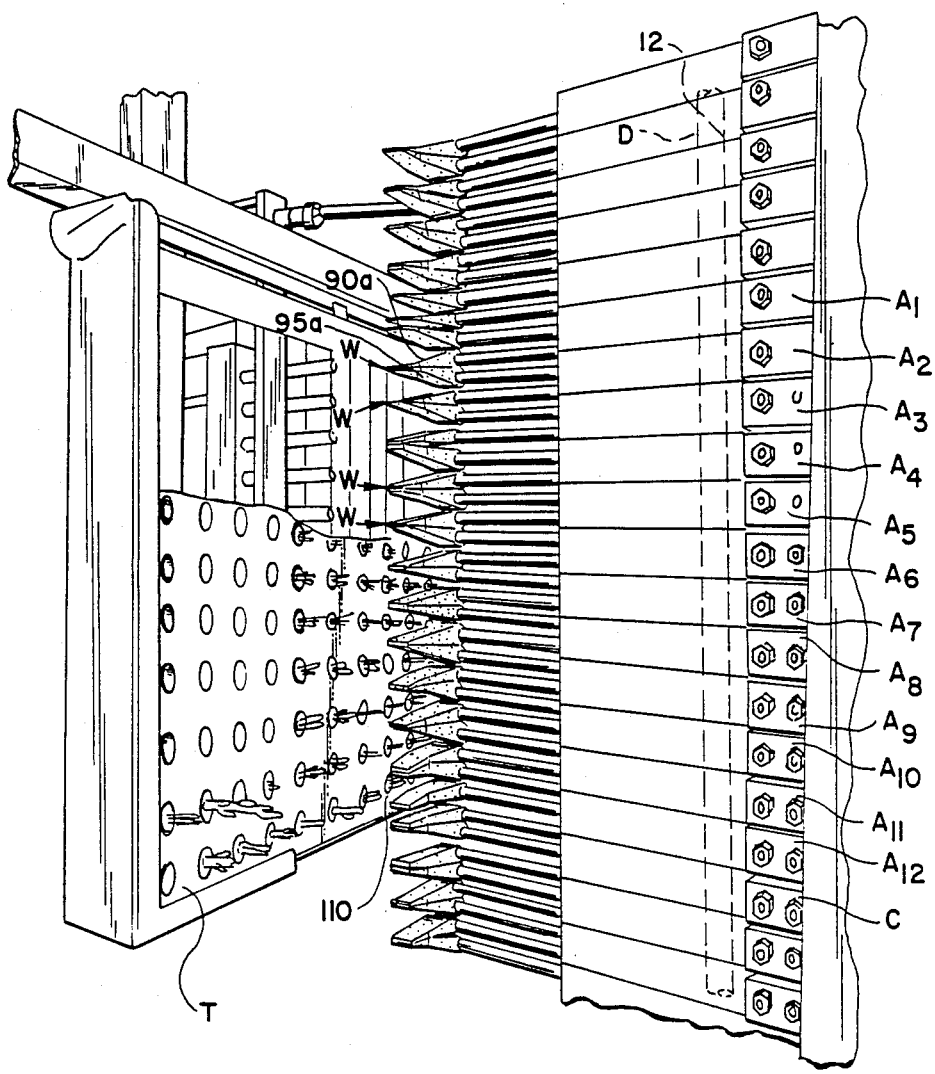
FIG._3A.

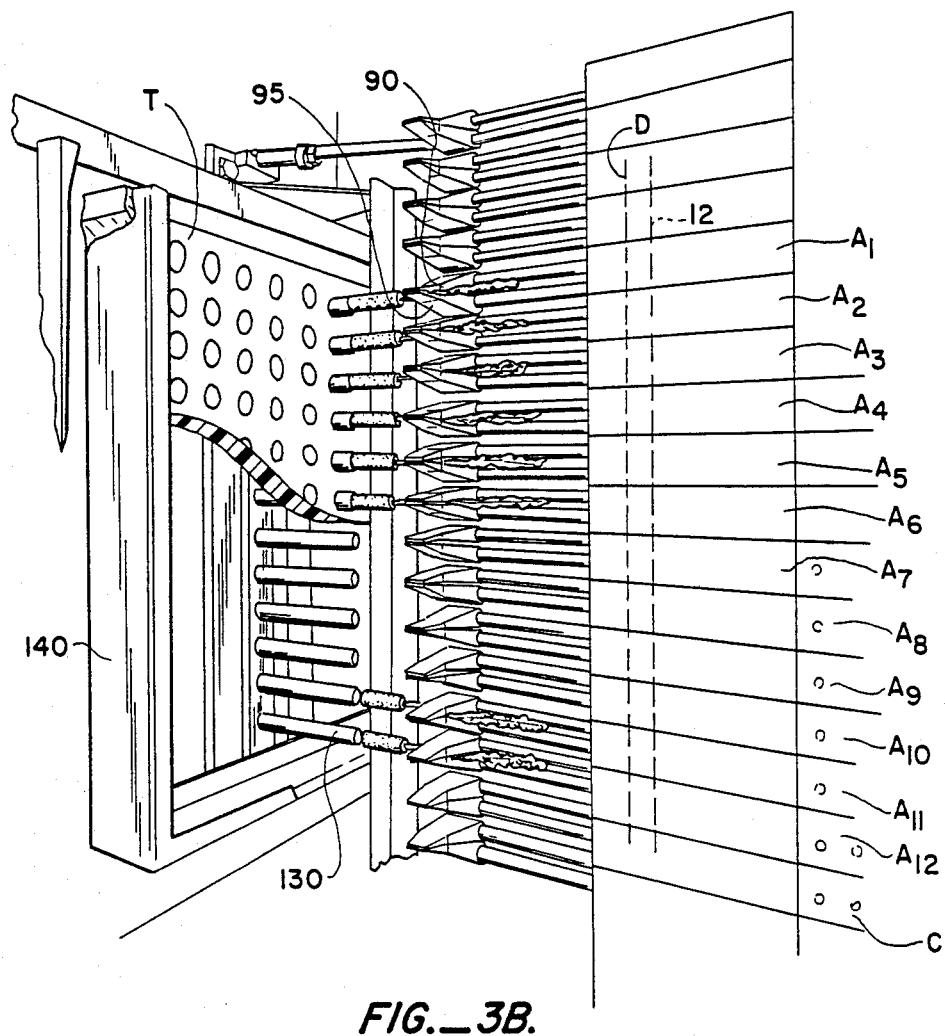
FIG._3B.

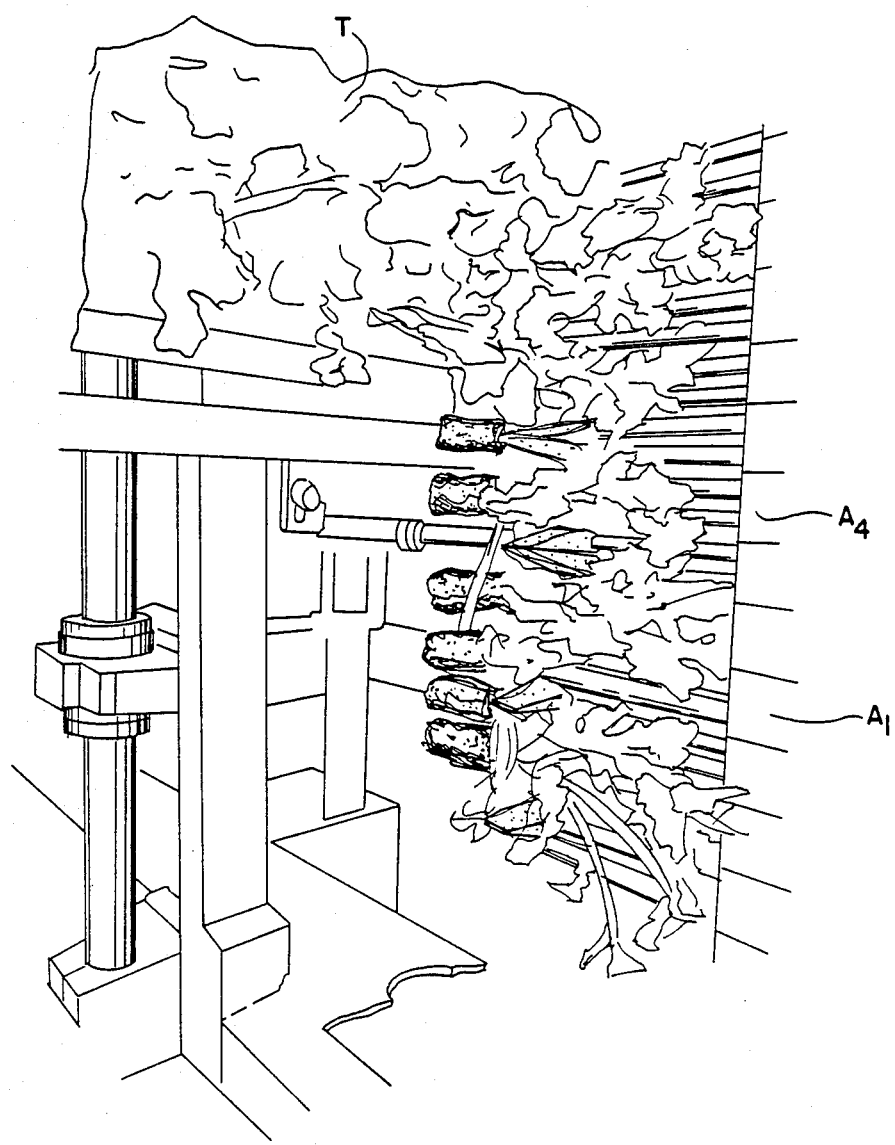
FIG._3C.

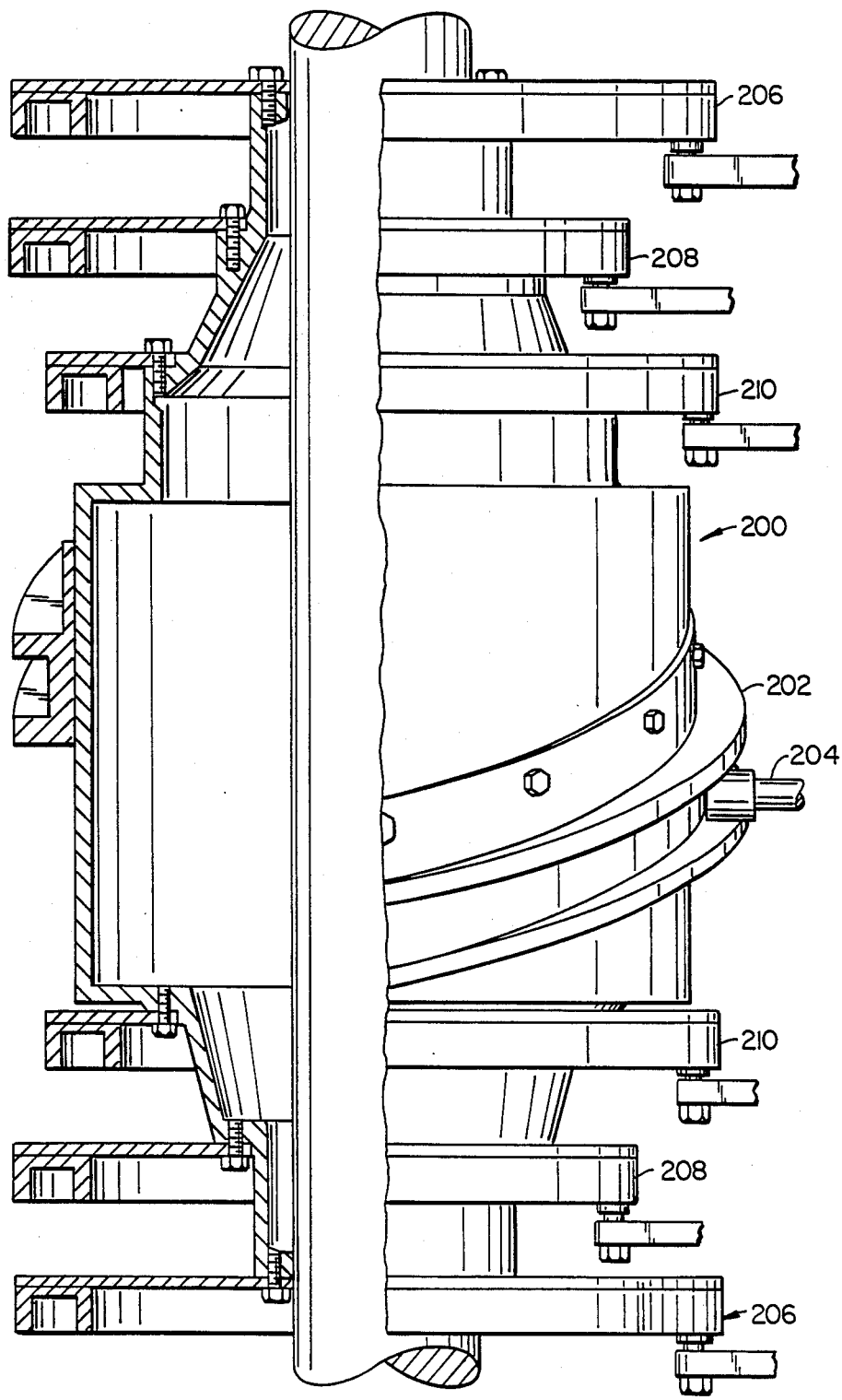
FIG_4.

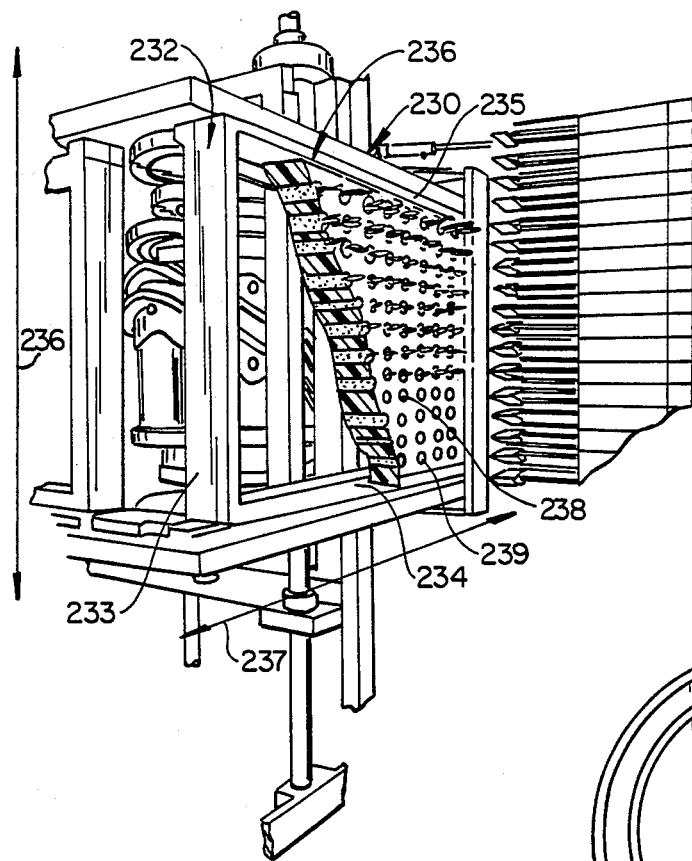
FIG._5.
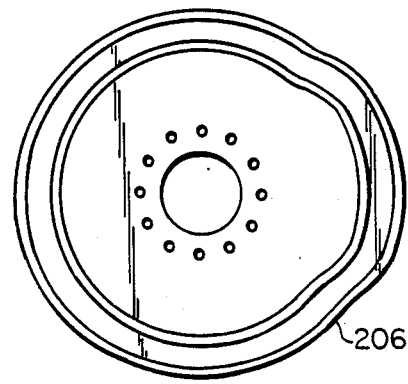
FIG._6A.
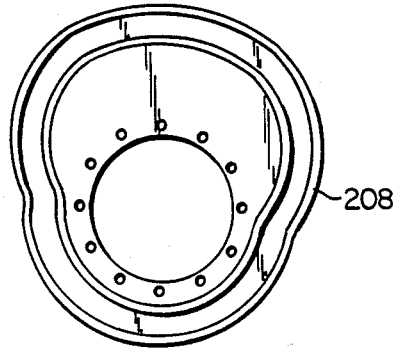
FIG._6B.
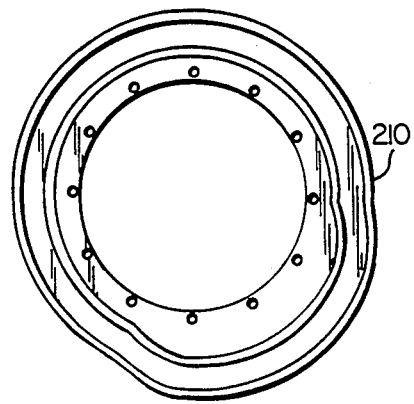
FIG._6C.

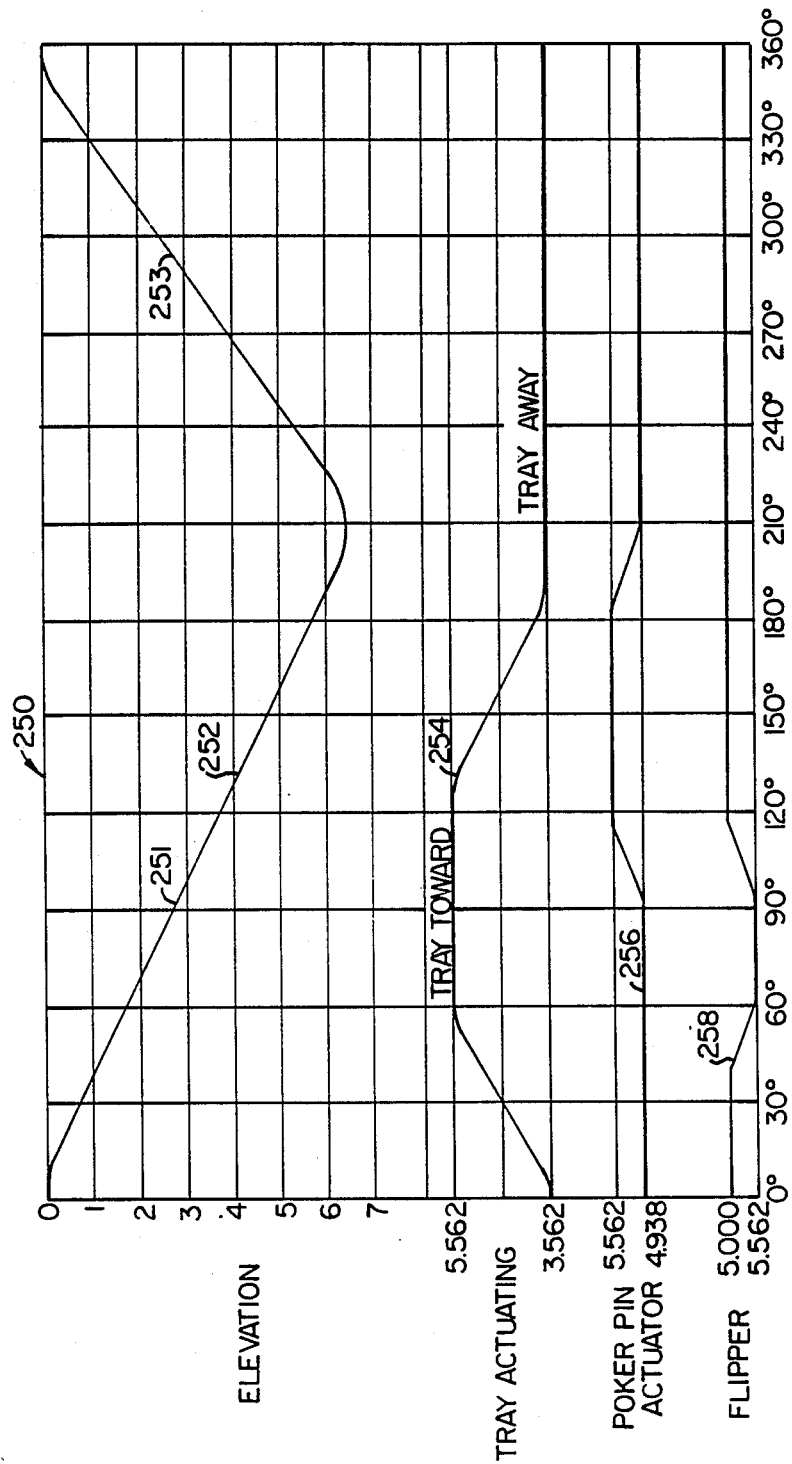
FIG._7.

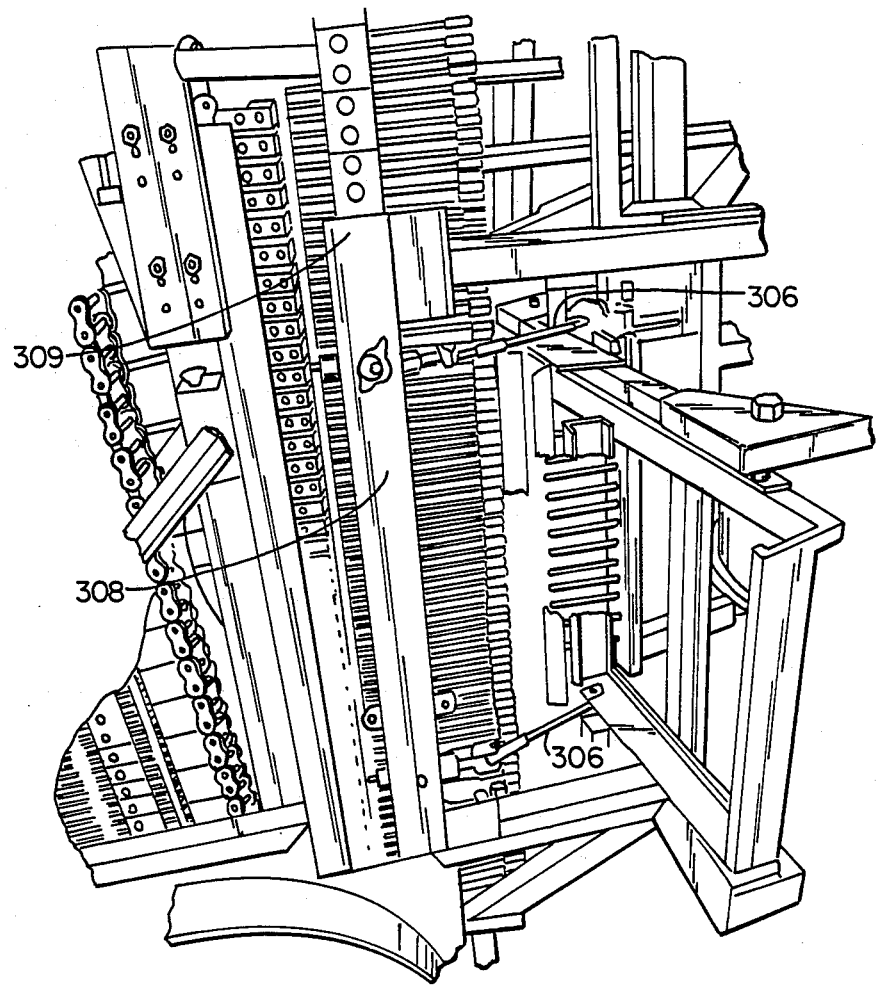
FIG._8.

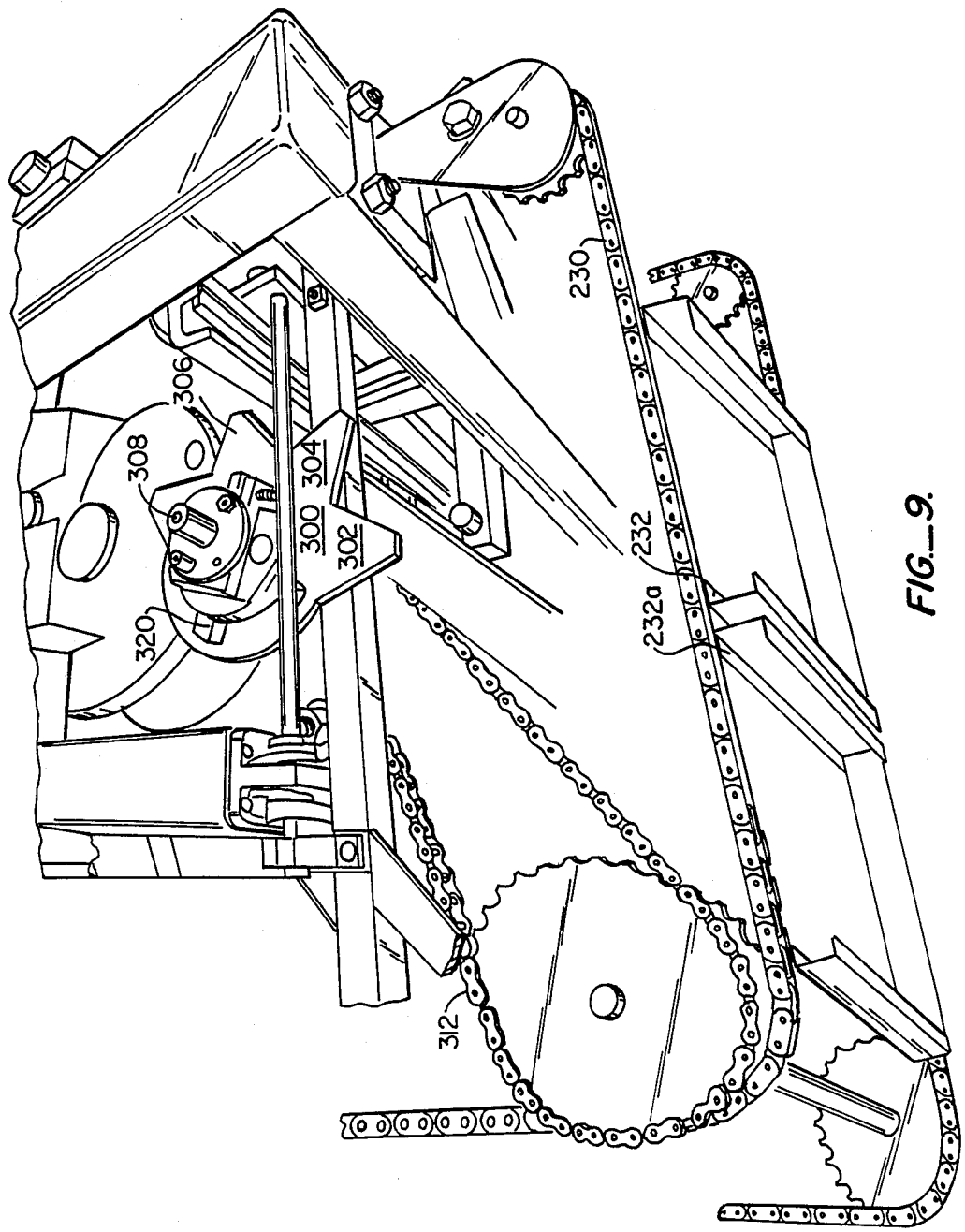
FIG._9.

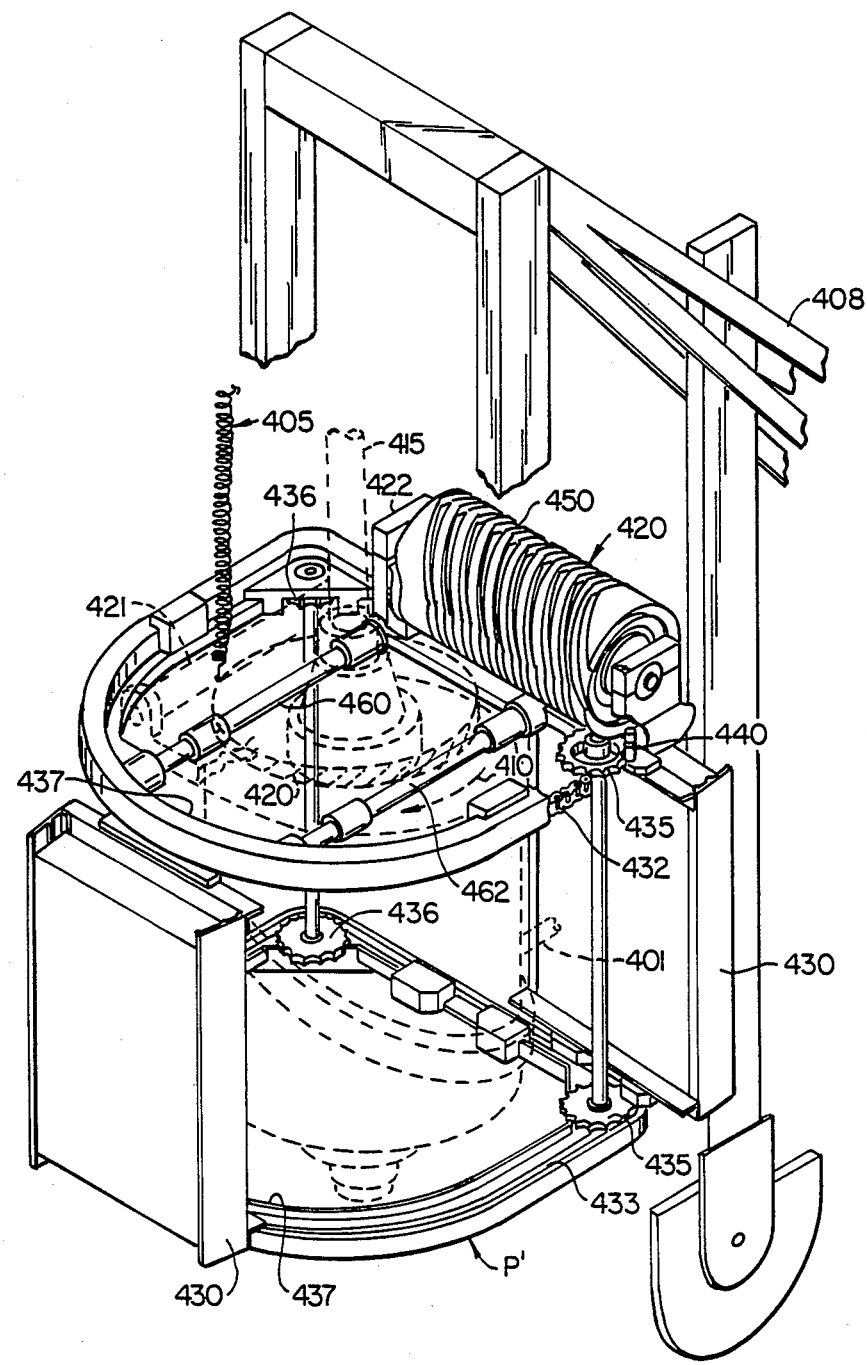
FIG._10.

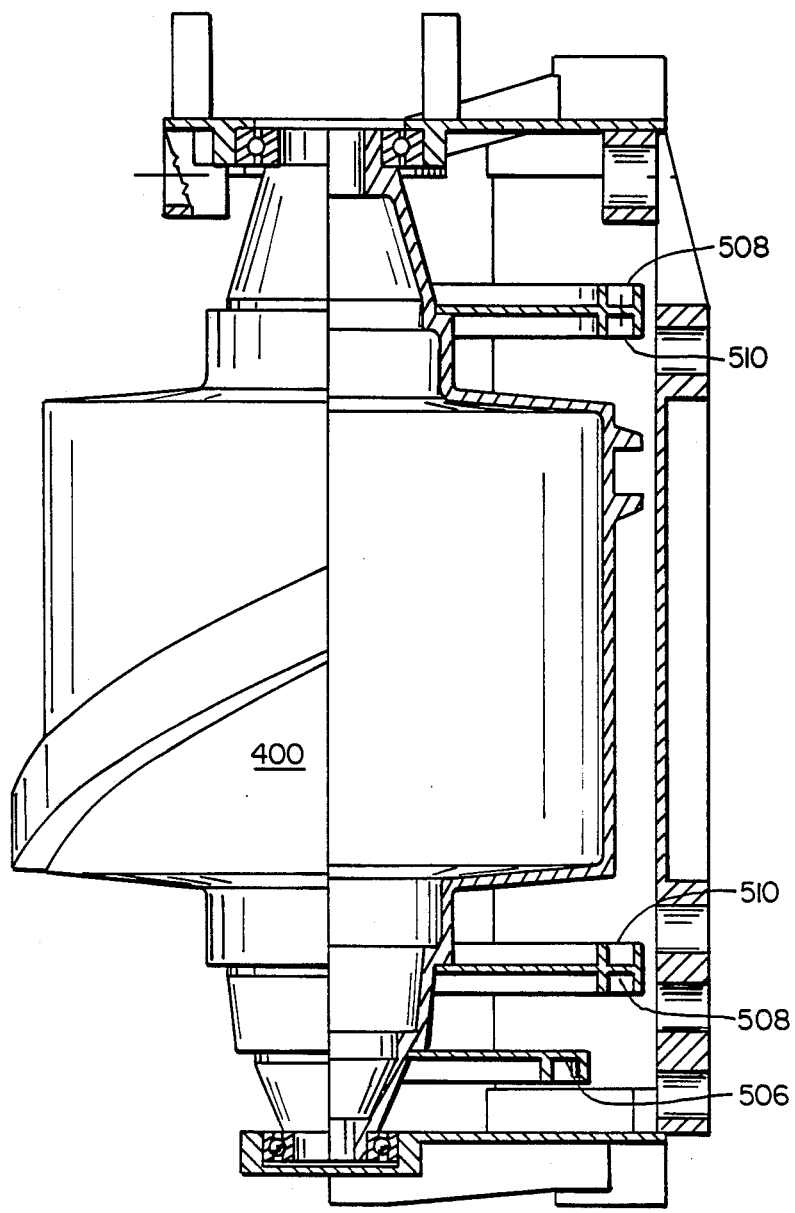
FIG._11.

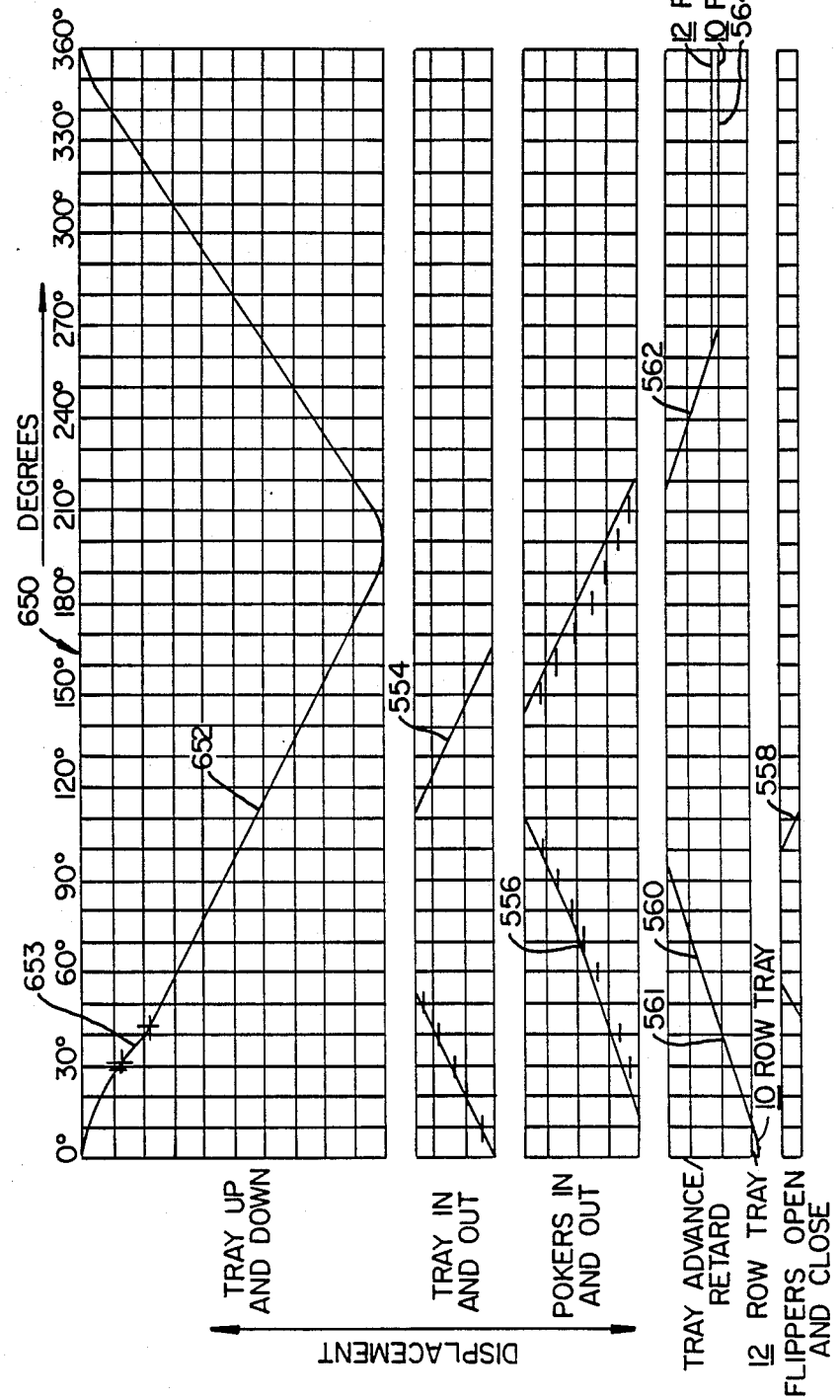
FIG._12.

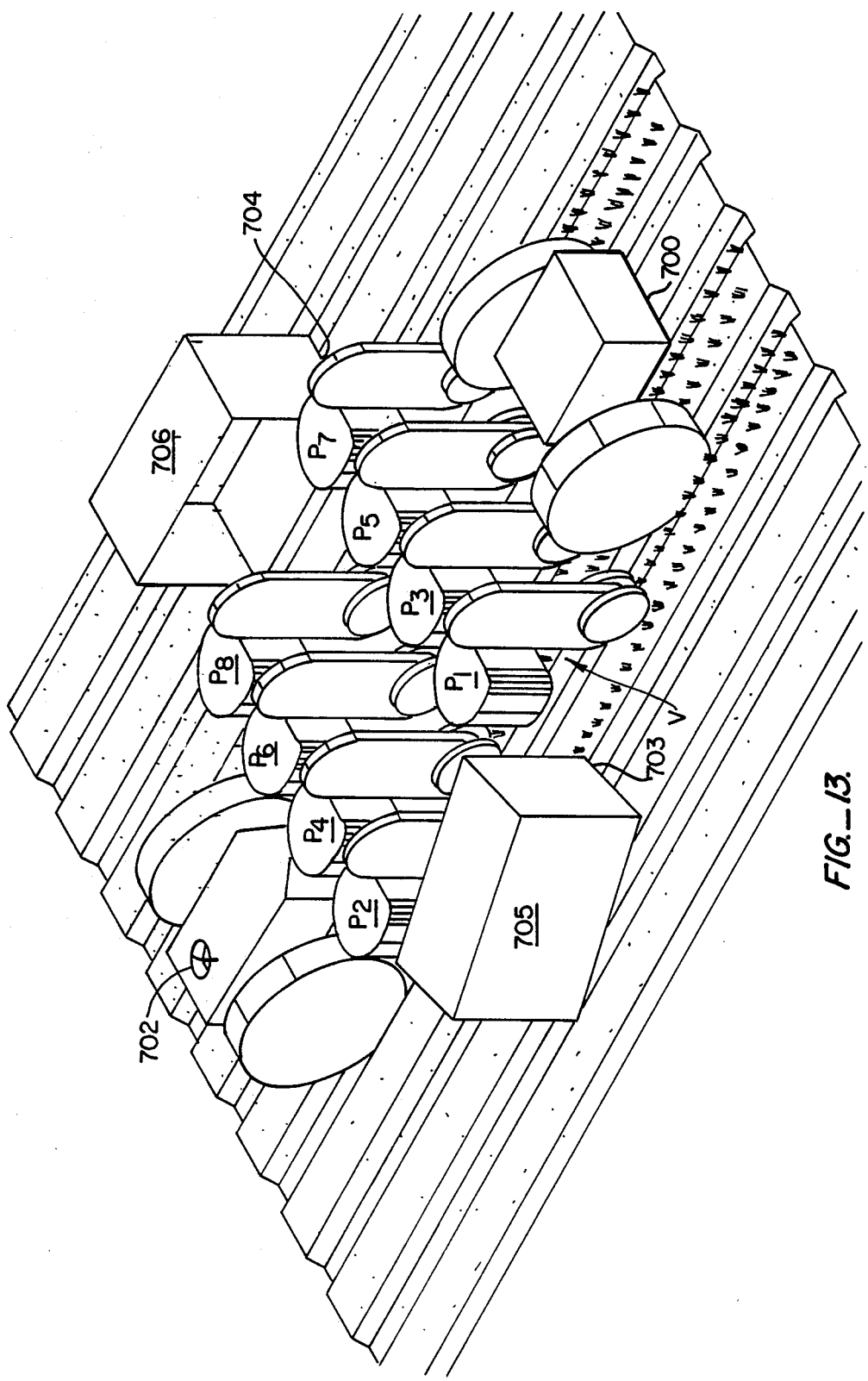
FIG._13.

PLANT TRANSFER MECHANISM

PLANT TRANSFER MECHANISM

This application is a continuation-in-part of copending patent application Ser. No. 900,942 filed Aug. 27, 1986.

BACKGROUND OF THE INVENTION

This invention relates to transplanters. Specifically, this invention relates to a transfer apparatus wherein plants are taken from a high density incubating tray and moved by a transplanter to a spaced apart disposition in a secondary growing location.

SUMMARY OF THE PRIOR ART

Transplanter having fingers are known. Numerous devices have been proposed for transferring plants from growing trays to passing rows of planting fingers.

In the prior art, transplanting occurs usually by an intermediate mechanism. Typically, ejection from the high density incubating tray occurs to a passing intermediate mechanism. It is this intermediate mechanism that loads the conveyor. Typically, this intermediate mechanism is human; plants are typically fed by hand.

Statement of the Problem

In the process of transferring plants from high density stationary trays to a passing row of conveying fingers, the plants have to be accelerated. That is to say the plants have to be picked from the tray and moved—usually at a constant velocity—on the planting fingers. In movement from the tray to the fingers, the plants experience the forces of acceleration.

Planters typically use plant grasping fingers operating to grasp the stem and/or foliage of the plants. These fingers grasp the plant typically at the stem above a root bound soil mass. Any rapid acceleration to the plant while it is being held can and will cause plant damage.

Where a planter moves at a relatively constant velocity across the field, the planting fingers must of necessity traverse the field at substantially the same constant velocity as the planter. That is to say, at the moment of deposit of the plants to the field, the plants must be stationary with respect to the field. This in effect requires that a conveyor—such as a chain—have a string of finger assemblies that be constantly moving.

Alternatively, it has been known to have intermittently moving planter mechanisms. Such mechanisms have been generally unsatisfactory; they are extremely slow or they shake themselves apart.

The cheapest and most easily grown plant for commercial transplant usually comprise root bound incubated plants in densely packed trays. Unfortunately, these plants are at a level of maturity where they are easily damaged in both the extraction from their incubated trays and the acceleration required in taking the plants from their stationary tray to the moving fingers of a transplanter.

Indeed the most effective solution that the prior art has added to this problem is to require that such planting fingers be hand fed.

The reader will understand that a plant grasped at the stem which has a root bound soil mass and foliage is particularly vulnerable to forces of acceleration. Such forces can cause either the foliage or the soil mass to snap the stem and damage or kill the plant.

The reader will understand that the statement of the problem ofttimes is part of the invention.

Regarding the planter disclosed herein, it has been found that unless trays are positively synchronized with respect to the plant ejection mechanism, dislocation of the disclosed planting cycle occurs.

Further, it is has been discovered that in the automatic extraction of closely grown nursery plants movement of the tray and its remaining plants must occur well beyond the particular row of plants being extracted. Otherwise, entanglement of plants remaining in the tray with plants currently being manipulated for planting occurs. If such interference is not prevented, both the plant being manipulated by the plant grasping fingers as well as plants remaining in the tray can be damaged or dropped.

SUMMARY OF THE INVENTION

An improved transfer mechanism for extracting and transporting plants from a high density incubating tray to a singulated constant velocity conveyed path in which each plant is gripped by planting fingers is disclosed. The planter is moved across a field at relatively constant velocity and has the planting fingers conventionally depositing the plant upright and stationary with respect to the passing ground where they are covered by conventional furrowing and packing apparatus. The conveying planting fingers are serially mounted on an endless conveyor and hence pass the vicinity of the incubating tray from which extraction and transfer of the plants must occur at a relatively constant velocity. A tray extraction mechanism is provided which includes a tray conveyor, plant extractor plugs and a tray extraction reciprocation apparatus. The tray extraction reciprocation apparatus functions to oscillate the tray conveyor and plant extractors parallel to the path of the planting fingers. When the oscillation is in the same direction as the conveyed planting fingers, the speed of the planting conveyor is synchronized to the speed of the planting fingers. After this synchronization has occurred, the tray conveyor advances a row of plants into the opened planting fingers and the fingers close gripping the plant at the stem. At substantially the same time, the plug extractors and tray move relative to one another so that in cooperation with the gripping planting fingers, the plants are urged out of the tray. Once the plants are clear of the tray, the plug extractors retract completely through and out of the tray and the oscillation continues with movement opposite to the direction of the conveyed chain for the next cycle. By the expedient of loading the serially conveyed fingers with tray wide rows of plants, plant acceleration forces occur when the plant is protected by its incubating tray. Both transporting and transplanting of the plant occurred with the required forces of accleration held to a minimum. A timing screw is disclosed for driving the tray conveyor. An array of the disclosed planters is set forth.

Other Objects and Advantages

An object of this invention is to show an apparatus for the transfer of plants to a passing line of plant grasping fingers with minimal forces of acceleration experienced by the plants. A planter having a row of plant grapsing fingers moving at constant velocity is disclosed. A tray conveyor oscillates parallel to the path of the finger conveyor with a stroke in the direction of the conveyed fingers and a stroke opposite to the direction of the conveyed fingers. During the stroke when the tray conveyor is moving in the same direction as the finger conveyor, the respective speeds between the tray conveyor and the passing fingers are synchronized. Then, and only then, are the plants gripped by the planting fingers.

An advantage of this invention is that any acceleration occurring during oscillation of the tray conveyor accelerates the plants while they are protected in their incubating tray. Little or no damage can result to the plants.

A further advantage of this invention is that the oscillation cycle itself can be tailored to hold forces of acceleration to a minimum. Moreover, jerk can be completely avoided.

A further object of this invention is to disclose an exemplary mechanism for producing the required oscillation. According to this aspect of the invention the vertical oscillation is produced by a barrel cam. Disk cams coupled to the barrel cam produce the respective plug ejector movement, tray conveyor movement, and finger opening and closing.

An advantage of this aspect of the invention is that the barrel and disk cams are mechanically linked. Synchronized motion is assured.

A further object of this invention is to disclose a plant extraction mechanism and process wherein the plants are extracted to the plant gripping fingers. According to this aspect, once the trays are synchronized to the speed of the plant grasping fingers, the fingers grasp the plants at the stalk area. Thereafter, tray pokers enter the incubating trays through holes in the bottom of the tray. At the same time as this entry occurs, the tray is in effect drawn downwardly over the pokers. There results a cooperative movement between the plant grasping fingers, the tray and the extracting pokers so that the root bound soil mass is transferred from the tray to the stem holding planting fingers. Extraction without damage results.

An advantage of this extraction mechanism and process is that an entire row of plants are extracted within a short duty cycle. Consequently, a transplanter may move at a relatively high speed over a field.

Yet another object of this invention is to disclose an apparatus for positively locking a conveyed tray having closely grown nursery plants. According to this aspect of the invention, a timing screw is provided. The timing screw includes as many discrete resolutions as the tray has rows of plants to be extracted. The trays are placed within tray holders and conveyed along a path on a chain. The tray is driven in its conveyed path on the chain by a screw follower on the tray holder making direct contact with the timing screw. The timing screw drives the tray through the screw follower from the timing screw immediately adjacent the point of plant extraction.

An advantage of the improved tray conveyor is that the tray position is precisely controlled. Since the screw follower is attached to the tray holder, no slack in the chain is present that requires a field adjustment.

Yet another object of this invention is to disclose a drive for the tray conveyor timing screw. According to this aspect of the invention, the barrel cam driving the plant transfer mechanism in elevation is powered by a triangular shaft. The barrel cam rides a frame attached fixed cam follower. In following the cam, the barrel cam rises and falls in elevation. Atop the barrel cam there is provided a helical gear drive. The helical gear drive through a transmission rotates the timing screw on a ratio of one-to-one with respect to the barrel cam. There is provided a positive linkage gear lock and synchronized motion of the timing screw with respect to the barrel cam.

Yet another object of this invention is to disclose a pattern for horizontal movement between rows that prevents entanglement of foliage in densely grown nursery trays. According to this aspect of the invention, movement of the tray includes horizontally advancing three rows to grasp an exposed row of plants for extraction. Thereafter, the plants are extracted. When the plants are extracted, the tray is retarded horizontally about two rows from the point of extraction. Then and only then is the synchronous vertical motion between the plants in the tray and the plants in the planting fingers interrupted.

An advantage of this aspect of the invention is that the row of plants being extracted is not interfered with by the remainder of the plants within the tray. As such interference not only disturbs plants grasped in the planting fingers, but additionally damages or even destroys plants still within the tray. To ensure continuity of planting, it is vital that such interference be avoided.

Yet another advantage of this aspect of the invention is that the designed dwell time of the tray conveyor gives an operator time to remove the empty trays from the tray brackets and thread the empty tray brackets with trays full of plants so that transplanting can continue on an uninterrupted basis.

Yet another object of this invention is to disclose an over movement of the tray during downward oscillation to prevent plant hang up. According to this aspect of the invention, when the planting fingers on the vertical conveyor have moved away one complete row of plants from a position overlying a tray, the vertical elevation of the last plant fingers is moved well beyond the last plant. This movment beyond the last plant position in the tray frees the plant from any possible interference with the lowest portion of the tray. Thereafter, the tray vertically returns to the appropriate side-by-side relation of the plants for extraction.

An advantage of this aspect of the invention is that again interference between a grasped plant and a tray is avoided. The plant held within the planting fingers is maintained free from being crushed. At the same time, plants within the tray not yet extracted are likewise held free from interference, crushing, and damage.

Yet another object of this invention is to disclose a floating plant extraction mechanism for the required vertical synchronization with a vertically moving chain. According to this aspect, the plant extraction mechanism of this invention is suspended from a coil spring. Typically, the coil spring is tensioned so that the spring tension effectively counter balances the oscillating mass of the planter.

An advantage of this aspect of the invention is that the entire planter is capable of being dynamically precisely vertically positioned. Further, the vertical drive forces are constant; that is the force to oscillate the plant extraction group upwardly is approximately the same as the force to oscillate the plant extraction group downwardly.

Yet another advantage of this invention is to disclose a field array of planters of the disclosed planters for planting. Typically, a plurality of such planters are mounted in a side-by-side array. Every other planter in the side-by-side array is staggered in an array eight wide. The first, third, fifth and seventh planters are placed in a forward position; the second, fourth, sixth and eighth planter are placed in a rearward position.

An advantage of this aspect of the invention is that the planters can be arrayed with a common propulsion mechanism and platform. In this array, one operator can attend to more than one and preferably four machines. Such a vehicle capable of planting eight rows within a field is disclosed.

BRIEF DESCRIPTION OF THE DRAWINGS

Other objects and advantages and features of this invention will be more apparent after referring to the following specification and attached drawings in which:

FIG. 1 is a perspective view of a single planting utilized in accordance with this invention for planting a row of plants;

FIG. 2 is a perspective view of the planting fingers utilized herewith;

FIGS. 3A, 3B, and 3C illustrate the motion required for having the fingers of FIG. 2 grasp plants from a high density incubating tray;

FIG. 4 is a perspective view of a barrel cam arrangement, which barrel cam arrangement enables the oscillation cycle and extraction cycle set forth herein to take place;

FIG. 5 is perspective view of the barrel cam apparatus of FIG. 4 contained interior of the tray conveyor which is utilized for this invention;

FIGS. 6A, 6B, and 6C are plan elevation views of the respective disc cams used above and below the extraction cycle;

FIG. 7 is a cam actuation diagram from which the cams illustrated may be constructed;

FIG. 8 is a view of the planter of FIG. 1 illustrating the principal cam actuated parts;

FIG. 9 is a view of the apparatus for advancing plugs to the extraction apparatus;

FIG. 10 is a perspective view of the improved planter of this invention illustrating a timing screw for conveying trays on a tray conveyor, it being noted that some of the trays in the tray conveyors are omitted for clarity of understanding;

FIG. 11 is a side elevation view of an improvement of the barrel cam mechanism shown in FIG. 4;

FIG. 12 is a displacement versus rotation plot, the plot here illustrating with emphasis the improved points of displacement; and FIG. 13 is a perspective of a common vehicle including eight of the disclosed transplanters for transplanting a field.

DESCRIPTION OF THE PREFERRED EMBODIMENTS

Referring to FIG. 1, a planter mechanism P is shown. The mechanism includes an endless chain C and a cam traveller path D. Chain C is disposed in an endless belt configuration between an upper pulley 14, and a lower pulley 16.

The chain has attached thereto a plurality of planter finger assembles A. Assemblies A gather plants from trays T disposed on a tray conveyer. The plants are then transported and placed within the ground G in a path 20 behind the planter P.

Referring to FIG. 2, a perspective view of a finger assembly A is illustrated. Assembly A includes a U-shaped element 30 including a bottom U member 31 and two end U members 32, 33. Paired planting finger shafts 40, 44 are utilized. Fingers 40, 44 transpierce on parallel bores the respective ends of the U-shaped clamp 30. Finger shaft 40 trasnpierces U end 32 at bore 41 and turns on U end 33 on bearing 42. Similarly, finger 44 transpierces U end 32 on bore 45 and pivots U end 33 at bearing 46.

Both fingers have a spiral cam. The spiral cams are oppositely disposed. Spiral cam 51 on finger shaft 40 is opposite to spiral cam 55 on finger shaft 44. A cam follower assembly 60 rides over each of the fingers 40, 44. Riding occurs along the respective cams 51, 55. Cam follower 60 includes respective bores 62, 64 for receiving the finger shafts and the disposed cams.

Conventional and joined cam followers for following the spiral cams 51, 55 are used. Such a conventional cam follower 71 for following cam 51 on finger 40 is shown. The remaining cam follower for shaft 44 is hidden from view.

A cam path follower 80 is attached to assembly 60. This cam path follower 80 allows assembly 60 to move from a position where the respective plant grasping fingers 90, 95 are closed to a position where the cam fingers 90a, 95a (shown in broken lines) are opened.

Operation of the device can be easily understood. Specifically, when the cam follower assembly 60 is in the position shown in the solid lines, fingers 90, 95 are closed in the position shown in solid lines. When the cam follower 60a is in the position shown in broken lines, the respective fingers are in the position shown at 90a and 95a (also in broken lines).

U-shaped assembly 30 is attached at a lug 36 to chain C. Thus, the finger assembly A is held at substantial right angles to the finger.

Fingers 90, 95 are typically made of rubber. As can be seen, they are each wedged shaped. The wedges have their thick portions 100, 102 attached to the shafts. The thin and plant gripping portions 103, 104 extend away from the respective finger shafts. Both stiffness and elasticity of the fingers are chosen to suit the crop. For example, reinforcement of the illustrated fingers with wire could occur.

Referring to FIG. 3A a view of a tray T with respect to a plurality of finger assemblies A1 through A8 is illustrated. Fingers A1 through A4 are shown overlying a mechanism for ejecting plugs from trays. The tray T has been broken away so that the apparatus can be understood without the presence of plants.

Finger assemblies A5 through A8 are shown overlying the tray itself. The function of the fingers in singulating the plants can be seen and understood.

In FIG. 3A, cam follower path D is shown in broken lines. It will be understood that cam follower path D is movable towards and away from chain C at moveable track path 12. The mechanism for such movement is cam actuated.

In FIG. 3A, cam follower path D is disposed immediately adjacent the chain C. Consequently, the follower assemblies 60 are moved to the position 60a illustrated in FIG. 2. Fingers 90, 95 move to the opened position.

As can be seen in FIG. 3A, the wedge shaped fingers 90a and 95a of adjacent finger assemblies form a receiving wedge W. Wedge W functions to divide and separate plants on either side of the wedge between the opened fingers 90, 95 of the respective finger assemblies.

Once the plant receiving wedges W have been formed, tray T is advanced into receiving the wedges. An exposed row of plants 110 is singulated. In such movement, the plants and associated foliage will be forced between the opened fingers of the finger assemblies. Plants will not be caught between or entangled with either adjacent finger assemblies A1–A8.

Referring to FIG. 3B, it will be seen that cam path D has been moved away from chain C. Consequently, assembly 60 moves to the position shown in solid lines in FIG. 2 and respective fingers 90, 95 close about the stems of the plants which may vary significantly in girth.

The plants here grasped are ejected from trays by poker pins 130. The trays are in turn held between rails 140 (only one such rail being shown). Movement of the rod ejectors 130 and the tray rails 140 is cam actuated. Such movement assists ejection of the grasped plants.

Referring to FIG. 3C, transport of the plants can be easily understood. Finger assemblies A1–A4 are shown with plants stems grasped between the respective fingers 90, 95. The fingers are moving to and towards the ground. At the ground, the fingers are opened, provided with the desired spacing and deposited and packed as is conventional with known planters.

The reader will understand that I have illustrated the transplanting of root bound nursery grown plants. In such transplanting, the plants are grasped at their stems and the binding of the roots is relied upon to entrain sufficient soil from the tray T to the ground G to enable a successful transplant.

It is known to grow nursery plants in elastomeric plugs. Those skilled in the art will understand that the disclosed fingers, or adaptations of the disclosed fingers, can be utilized to grasp the soil mass of the transplanted plants in elastomeric plugs. While this is not preferred, the disclosed finger assembly can be adapted to this end.

Having set forth the operation of the planting fingers and the cooperation of the tray, the barrel cam arrangement of this invention can be seen with respect to FIG. 4.

A barrel cam assembly 200 has an elevational cam 202 with a cam follower 204 following thereon. This apparatus causes the conveyor to rise and fall during each cycle. The rising and falling of the conveyor—even at relatively high speeds of planter traverse over a field—can be followed by an operator whose task is to unload empty trays and to reload full trays. Rising and falling of the conveyor mechanism occurs on a series of vertical shafts with the cam follower on the barrel cam causing the rise and fall. Turning of the barrel cam assembly 200 occurs through a conventional spleened shaft and rotating spleened bearing. Chain speed is linked to cam assembly 200 rotation and resultant rise and fall of the conveyor. Appropriate adjustment of the driving sprockets for the chain assembly produces the synchronous speed desired between chain and tray conveyor.

It will be remembered from the view of FIG. 1 that the plants are spaced by the fingers as they are deposited on the ground. At the same time, the plants are densely packed in the trays. Consequently, the rate of speed of the conveyor assembly is proportionately slower than the speed of actual movement of the planter over the ground.

Three additional movements are required to enable smooth extraction of the plants. These movements are described and actuated by the respective cam pairs 206, 208, 210. Specifically, outer cam pairs 206 open and close the planting fingers in accordance with the timed cycle.

Medial cam pairs 208 cause the entire conveyor to oscillate towards and away from the planting fingers. In such oscillation towards and away from the planting fingers, a cooperation of the movement of the tray with the planting fingers occurs.

Finally, inner most cams 210 control the movement of the poker pins. Again, the poker pins move inwardly and outwardly to effect in cooperation with the tray movement extraction of the plants from the trays while nevertheless maintaining the stems in the grasp of the planting fingers.

Plan views of the respective cams are shown in FIGS. 6A–6C. Cam 206 is shown in FIG. 6A, cam 208 is shown in FIG. 6B and cam 210 is shown in FIG. 6C.

Referring simultaneously to FIGS. 5 and 9, a tray conveyor 230 transports each individual tray in tray holding brackets 232 consisting of inwardly exposed U-shaped channel members 233, 234, 235. These channel members form a frame into which three side edges of a tray can fit. Removal and replacement of trays occurs from overhead.

In the view of FIG. 5, a tray is illustrated broken away. Individual cells 238 can be seen. The cells are tapered and preferably given a square cross section.

At the bottom of each cell or at the side of the cell facing away from the foliage of the plant, there is a hole 239. This conventional hole serves two purposes.

First, it permits adequate drainage when the plant is irrigated during incubation.

Secondly, it is the aperture through which the plant pokers can enter to produce the cooperative extraction.

Referring to FIGS. 5 and 9, it will be seen that the tray conveyor is given a square path. Consequently, the individual frame assemblies 232 are fastened at two points to upper and lower chains so that the chain movement permits the frames to pivot around the corners of the square conveyor path.

The lineal path of the tray conveyors enables removal of empty trays and the insertion of loaded trays. While it will be realized that the entire conveyor is undergoing motion, the motion is held to a rate and degree of excursion where it does not substantially interfere with the operator in loading the apparatus.

Referring to FIG. 7, cam plot 250 illustrates the construction of the cam. Those having skilled in the mechanical arts may quite easily duplicate the cams of this invention utilizing the plot here shown.

Specifically, line 252 is an elevational plot of the cam apparatus. This is synchronized to the speed of the chain when the finger assemblies A are held in the closely spaced and adjacent relationship. Portion 251 of curve 252 constitutes the portion of the oscillating cycle in which the rate of descent of the tray conveyor is synchronized with the rate of descent of the planting fingers assemblies A. It is during this time that plant extraction occurs.

Section 253 of the curve 252 is the upward movement of the tray. It will be noticed that this portion of the cycle is shorter.

Regarding the transition between the duty cycles, it will be understood that this is restricted to maintain the forces of acceleration at acceptable limits. At the same time, the entirety of the oscillating movement must be such that loading can conveniently occur.

Referring to curve 254 it will be seen that as the entirety of the conveyor mechanism descends, it is oscillated towards and away from the planting fingers. Specifically, it is oscillated towards the planting fingers before the flippers close. Once the flippers are closed and the plants have been grasped, then tray is drawn, effectively away from the planting flippers.

The extraction process of this invention requires the cooperation of the planting fingers, the plug pokers, and the tray mechanism. This may first be described. Thereafter, reference to the cam actuation diagram of FIG. 7 will complete the description.

First, entry of the plug pokers to the tray compresses or "takes up the sponge" in the root bound soil mass. This is preferably done while the plant is in the grasp of the planting fingers at the stalk or foliage end.

Thereafter, and once the sponge has been taken up, the tray is drawn down over the pokers. This drawing motion occurs while the plant is in the grip of the planting fingers. It is this motion which effects the complete extraction of the plants from the cells in the incubating tray.

When the tray is drawn down over the planting fingers, the distance between the fingers and the poker assemblies remains preferably unchanged.

Finally, and once the plants are completely extracted, movement of the tray away from the extracted and finger held plants is desirable. This prevents entanglement of the foliage of the remaining plants with the foliage of the removed plants.

Reference to FIG. 7 will confirm the following sequence. Curves 254 (plant poker motion) and 258 (tray motion) will confirm the sequence set forth.

Finally, the flippers must be controlled. They are controlled in their opening and closing movement. Control is provided in accordance with the cam diagram of 258.

Referring to the view of FIG. 5, it is seen that the most convenient and economic location for the barrel cam assembly 200 is in the center of the square conveying path.

The entire conveyor is required to have two degrees of motion responsive to the cams. These motions include up and down motion along axis 236 and motion towards and away from the planting fingers along axis 237. Such motion occurs on conventional slides.

Referring to FIG. 8, most of the cam followers can be illustrated.

Referring to FIG. 8, cam connections 306 will be seen to move a channel 308. Channel 308 connects to actuator 80 on a tray wide group of finger assembles A. This channel 308 includes gathering sections 309 and 310 and effectively opens and closes the flipper assemblies in accordance with movement of cam 206 (see FIG. 4) and cam movement diagram curve 258.

Poker pins 130 are similarly moved.

Finally, oscillation of the entirety of the conveyor assembly towards and away from the planting fingers is similarly actuated by connecting rods along axis 237.

It has been found that once the plants have been grasped by the fingers and their soil bound root mass is clear of the tray, there remains a tendency of the losing planting fingers to interfere with the foliage of an adjacent row of plants. This tendency of interference can be relieved by providing the conveyor 230 with a movement of oscillation super imposed upon its conveyance. Specifically, this movement moves the tray slightly away from the row of planting fingers being grasped. Once the plant and the plug extractors are clear of the tray.

Referring to FIG. 9, the mechanism for the intermittent advance of the conveyor 230 is illustrated. Specifically, a star wheel cam 300 is illustrated. The cam includes respective cam surfaces 302, 304, 306, and 308. These cams surfaces in effect incrementally rotate a chain 312. The rotation of chain 312 causes incremental advance of the tray to grasp the plants of each row.

As in planters known in the art, an end of tray condition is commonly encountered. This end of tray condition is encountered between trays 232 and 232a in FIG. 9. Referring to wheel 300 there is illustrated below the wheel cam blocks 320, 322. These respective cam blocks allow sufficient advance of the tray conveyor when the last row of plants is picked from rack 232 to permit the first row of plants in rack 232a to be grasped by the planting fingers.

It may be desired to effect movement of the trays away from the gripped and extracted plants. Such movement prevents interference between the plants extracted and the plants remaining in the tray.

Referring to FIG. 1, I therefore place a cam or timing screw 300 on the tray conveyor. Timing screw 300 engages cam pawls 301 on the tray conveyor. This timing screw causes towards and away movement of the tray once the plants have been extracted. For example, movement can be three plant row spaces towards the planting fingers (to place a row within the plant extracting fingers) and two rows away from the planting fingers (to prevent interference of the extracted plants).

Referring to FIG. 10, a preferred and newly improved embodiment of the plant extraction mechanism is shown. A barrel cam 400 follows a fixed cam follower 401. A coil spring 405 suspended from a field frame 408 counter balances the weight of the entire extraction mechanism. Thus, when barrel cam 400 rotates in the direction of arrow 410, rise and fall of the entire planter assembly T' occurs.

Driving of the timing screw 420 may now be understood. Thereafter, the action of timing screw 420 in effecting movement of the trays will be set forth.

At the top of barrel cam 400 keyed for sliding up and down movement to a triangular section shaft 415 are located a worm gear drive 420 driving a worm gear 421. Worm gear 421 through gear 422 rotates timing screw 420. The rotation of tray conveyor timing screw 420 to planter elevation cam 400 is a one-to-one relationship.

Having set forth the planter, the tray conveyor can be discussed.

Each planter assembly T' includes six tray receiving brackets 430. For clarity of understanding in FIG. 10, only two such tray brackets are shown.

Tray brackets 430 are fastened to an upper chain 432 and to a lower chain 433. Chain 432 and 433 pass between two conventional shaft mounted sprockets 435 at the upper and lower end of the planting mechanism T' and around to conventional shaft mounted sprockets 436 at the opposite side of the planting mechanism. Between sprockets 436 and 435 the chain passes through two "D" shaped races 437. It can thus be seen that the trays are conveyed in an arcuate path as empty trays are removed and full trays are washed.

The plug dispensing mechanism is situated immediately under timing screw 430. Timing screw 430 engages a pawl 440 on a tray bracket 430. Pawl 440 of tray bracket 430 is received at an open end of timing screw 420 at the precise moment that a similar pawl on a preceding tray bracket 430 is discharged. (The preceding tray not being shown.)

Operation of the timing screw can be easily understood. Timing screw 420 has as many discrete rotations 450 as there are rows of plants to be planted in the tray. For example, when a ten row tray is utilized timing screw 420 will have ten discrete flights. Where, however, an eight row tray is utilized, timing screw 420 will have eight discrete flights. It can also be seen that as one tray is conveyed in a tray container 430 underlying the timing screw, all remaining trays are conveyed. This conveyance occurs through the respective chains 432, 433. This direct drive of the tray bracket constitutes an improvement over that tray drive disclosed in FIG. 9.

Referring to FIG. 11, and making a brief comparison with respect to FIG. 4, it can be seen that the improved plant extraction mechanism is substantially the same in all other aspects as that previously illustrated.

Specifically, barrel cam 400 has attached to it a lower cam 506. Cam 506 through a follower and linkage controls opening and closing of the plant fingers similar to the action of cam 206. A cam 508 controls towards and away movement of the tray conveyor. Such towards and away movement occurs with the mechanism sliding on bars 460, 462.

Finally, a cam 510 controls poker rod movement. This movement causes the appropriate ejection of the plant from the tray once it is grasped by the planting fingers.

Referring to FIG. 12, a plot of cam action versus rotation is disclosed. Utilizing the plot of FIG. 12, those skilled in the art can easily construct the precise cam motion called for by this invention. The plot of cam displacement is shown in inches. This plot of displacement is graphically plotted against the degrees of cam rotation from 0 x to 360 x.

Referring to curve 652, the actuation of the up and down tray movement is the same. However, at area 653, it will be noted that downward movement of the tray is accelerated and over extended. This acceleration and over extension of downward movement of the tray, prevents the topmost extracted plant from the previously planted row from becoming entangled on the tray. By advancing the planting mechanism P' slightly beyond the tray and then normalizing the tray movement back into synchronization with the planting fingers, prevention of plant entanglement of the last finger conveyed plant with the top of the tray is avoided. Namely, the last finger conveyed plant is prevented from becoming entangled upon the bottom part of the tray. If such vertical action is not included, two separate events can occur.

First, the last conveyed finger held plant can be damaged and even destroyed.

Secondly, the first plant to be grasped by the fingers can be entangled with the last conveyed plant. In short, two such plants can be lost.

Tray in and out curve 554 is substantially the same as curve 254 of FIG. 7. Moreover, poker pin actuating plot 556 is substantially the same as plot 256. Finally, clipper movement curve 558 is the same as curve 258.

The reader will understand that the plot of the timing screw is illustrated at 560. It can be seen that from a low point at 561, the tray advances three full stages. Thereafter, and at portion 562 retraction occurs for two full spaces.

It will be seen that at portions 564, a difference in tray retarding and advance is shown. The lower curve having reduced displacement is utilized where another tray containing twelve rows of plants is used. Specifically, the upper curve is utilized for trays having ten rows of plants, the case illustrated herein.

Naturally, planting fingers and their spacing on the chain must also be chosen to conform to the trays.

Having discussed the new planter of this invention, its placement in a vehicle for planting eight rows can be illustrated with respect to FIG. 13. Referring to FIG. 13, a vehicle V is illustrated. Vehicle V includes an engine and hydraulic compartment 700 and an operators compartment 702. The vehicle includes side wings 703 and 704 for containing plant bins 705 and 706. The reader can readily understand that the respective plant bins can be loaded onto and off of the vehicle at wings 703 and 704 as they are emptied by planter operators.

Planters are arrayed in side-by-side disposition. They are arrayed so as to plant every other row. Thus, planters P1, P3, P5 and P7 plant alternating odd rows. Planters P2, P4, P6 and P8 plant alternating even rows.

Typically, each row of planters P1, P3, P5 and P7 is manned by a first operator. Similarly, row P2, P4, P6 and P8 is manned by a second operator. Thus, as the trays are emptied, they can be removed and replaced with full trays while the planter repeats the automated cycle here disclosed.

It will be apparent that many modifications can be made to this invention. Specifically, substitutions for the cam assemblies here illustrated could be made. The most important aspect of this invention is that the tray is synchronized in its reciprocating oscillations to accomplish discharge of the plants to the constantly moving planting fingers. This same extraction mechanism delivers the plants to the ground. This constitutes a significant departure from the prior art.

What is claimed is:

1. Apparatus for transferring plants from a high density incubating tray containing said plants in rows to a planted disposition in a transplant location, each said plant including foilage, a stem, and a root bound soil mass, said plants for transfer to a continuously passing line of conveyed planting fingers having the same spacing as said plants in said rows; said apparatus comprising:

a continuously passing line of conveyed planting fingers, each said finger configured for grasping one of said plants by a stem;

said continuously passing line of conveyed planting fingers moving from a plant receiving a station to a transplanting location, means for oscillating said tray parallel to the direction of said continuously passing line of conveyed planting fingers including a first stroke in opposition to the direction of said passing fingers and a second stroke synchronized to the speed of said passing fingers;

means for opening a group of fingers in said continuously passing line of conveyed planting fingers for receiving said plants at said stem during a first part of said second stroke synchronized to the speed of said passing fingers and closing said group of fingers in said continuously passing line of conveyed planting fingers to grasp said plants at said stem during a second part of said second stroke synchronized to the speed of said passing fingers;

means for extracting said incubating tray from said plants in said fingers during said second part of said second stroke synchronized to the speed of said passing fingers whereby said plants are transferred to said planting fingers and held by said stem with said root bound soil mass depending from said stem, means for oscillating said tray to and from said planting fingers normal to the direction of said continuously passing line of conveyed planting fingers along a plane normal to a row of plants in said tray, said oscillation being towards said planting fingers during the time said planting fingers are open and being away from said planting fingers during the time said plants are extracted from said tray whereby said tray is moved away from plants within said planting fingers to prevent interference between the root bound soil mass of said plants in said fingers and the foilage of plants remaining in said tray.

2. The apparatus of claim 1 and wherein said means for oscillating said tray to and from said planting fingers includes means for oscillating said tray parallel to a plane including the surface of said tray.

3. The invention of claim 2 and wherein said means for oscillating said tray to and from said planting fingers includes an oscillation having an amplitude exceeding the spacing of rows in said tray.

4. Apparatus for transferring rows of preselected numbers of plants from a high density incubating tray to a continuously passing line of conveyed planting fingers, said conveyed planting fingers for planting said plants in a transplant location, each said plant including foilage, and a root bound soil mass, said apparatus comprising:

a continuously passing line of conveyed planting fingers, each said finger configured for grasping one of said plants;

means for oscillating said high density incubating tray parallel to the path of said passing continuous line of conveyed planting fingers at a rate to allow one complete oscillation to occur as said preselected number of planting fingers passes said tray;

said oscillating including a first stroke in opposition to the path of said passing continuous line of conveyed planting fingers and a second synchronous stroke parallel to and in synchronization with said passing continuous line of conveyed finger, said second synchronous stroke having first, second and third portions;

means for opening a group of planting fingers at least as wide as said row of plants to permit said fingers to grasp said plants during said first portion of said second synchronous stroke;

means for closing said fingers on said plants during said second portion of said second synchronous stroke whereby said plants while still in said tray are grasped by said fingers;

means for extracting said tray from said plants at said root bound soil mass to said closed fingers during the third portion of said second synchronous stroke whereby said continuously passing row of planting fingers is filled with plants for transplant; and means for oscillating said tray to and from said planting fingers normal to the direction of said continuously passing line of conveyed planting fingers and normal to a row of plants in said tray, said oscillation being towards said planting fingers during the time said planting fingers are open and being away from said planting fingers during the time said plants are extracted from said tray whereby said tray is moved away from plants within said planting fingers to prevent interference between the root bound soil mass of said plants in said fingers and the foilage of plants remaining in said tray.

5. The invention of claim 4 and wherein said means for oscillating said tray to and from said planting fingers includes means for oscillating said tray parallel to the surface of said tray.

6. The apparatus of claim 5 and wherein said means for oscillating said tray to and from said planting fingers includes an amplitude for the movement of said tray exceeding the width between paired rows of plants in said tray.

* * * * *